ated Mar. 28, 1961

2,977,298
HIGH-SELECTIVITY AND CONDUCTIVITY PERM-SELECTIVE MEMBRANES AND PROCESS FOR PRODUCING SAME

Brian Alfred Cooke, Thomas David Morgan, and Hildegard Emilie Luise Gertrud Schweigart, all of Pretoria, Transvaal, Union of South Africa, assignors to South African Council for Scientific and Industrial Research, Pretoria, Transvaal, Union of South Africa No Drawing. Filed Nov. 5, 1957, Ser. No. 694,491
Claims priority, application Union of South Africa Nov. 9, 1956
14 Claims. (Cl. 204—296)

This invention relates to permselective membranes, anionic or cationic, which are suitable for use in the electrodialytic demineralisation of saline water.

The characteristics accepted as criteria for good permselective membranes are high permselectivity in electrolytes of quite high concentrations and having a wide range of pH values, high electrical conductivity and low permeability to electrolytes. One of the chief difficulties in the preparation of permselective membranes is found in securing desirable values of all these properties in combination, especially if regard be paid to the cost of preparing the membranes. Thus, a low permeability to electrolytes and a high degree of permselectivity are insufficient for membranes to be used for economical demineralisation processes unless these properties are combined with a high value of electrical conductance. In the prior art very little attention has been given to the requirements as regards permeability to electrolytes of permselective membranes to be used for economic electrodialytic processes and, in particular, no specific disclosure has been given of means for achieving such a value of said permeability.

It can readily be shown, by a consideration of the ion transfer occurring through permselective membranes in electrodialytic apparatus, that free diffusion of electrolytes must not occur to any large extent through the membranes under the influence of the concentration differences which are present in the apparatus. Concerning this point, consideration should also be directed to the fact that the effective concentration difference may be greater than the difference of the concentrations of the bulk solutions as a result of the formation of liquid layers adjacent to the membranes in which the electrolyte composition and concentration may be unlike those in the bulk solutions. It has been established experimentally that an optimum range of values exists for the rate of free diffusion of electrolytes through permselective membranes of either species, cationic or anionic. The upper limit of this range is governed by the electrical requirement of efficient and economical demineralisation, whereas the lower limit is chiefly governed, in the case of membranes based on cellulosic matrices, by mechanical considerations, more particularly the fact that membranes of exceedingly low permeability to electrolytes are often brittle and difficult to assemble into plant. A further reason for avoiding membranes of an unduly low permeability to electrolytes, lies in the fact that it is difficult to obtain adequate electrical conductivity with such membranes. By experiment, a suitable range of values for the rate of permeability to electrolytes of permselective membranes has been found.

A method of preparing permselective membranes from hydroxylic, for example cellulosic, matrix substances is disclosed in U.S. Patent No. 2,805,196 and provides for causing hydroxyl groups in the matrix material to condense with the hydroxyl group in a compound of the methylolamide class, said methylolamide compound being characterized by possessing an ionic group or some group readily substituted by an ionic group. The said patent also indicates a method of crosslinking the hydroxylic polymeric chains by the use of compounds containing two methylolamide groups.

According to this invention, a method is provided for introducing a controlled degree of crosslinking into permselective membranes in which the required ion exchange activity is achieved by a method of the type given in U.S. Patent No. 2,805,196.

A preferred embodiment of this invention provides for the controlled degree of crosslinking being produced simultaneously with the treatment for the introduction of ionic groups.

Furthermore, the present invention provides a method of crosslinking permselective membranes to a controlled degree that does not entail the use of compounds containing two methylolamide groups.

Since it is highly desirable to accomplish the introduction of ion exchange groups ("activation") into, and crosslinking of, cellulosic base materials in a single operation, it is clear that the said activation and simultaneous crosslinking procedure must in some respects resemble the procedure according to the invention disclosed in U.S. Patent No. 2,805,196 for activation alone. According to the specification of said prior patent the activation procedure consists of the immersion of the cellulosic base material in a solution containing the methylolamide compound at a chosen pH, followed by heating the impregnated cellulosic material under appropriate conditions. In order, therefore, to obtain an impregnating solution which is capable of serving the dual purpose of activation and crosslinking and in which the component effecting activation of the cellulosic base material is a methylolamide compound, it is necessary that additional reagents be present which can effectively crosslink the cellulosic material under pH and thermal conditions substantially similar to those appropriate for the activation process alone, and moreover, these crosslinking reagents should not interfere unfavourably with the progress of the simultaneous activation reaction. Furthermore, the reagents forming the crosslinking components of the impregnation solution should be such that the desired degree of crosslinking is attainable by the use of a solution in which the concentrations of the crosslinking components are not high (say not more than 30% w./w. total) in order that the concentration of the activating reagent is not unduly depressed below that required to impart to the cellulosic material the desired ion exchange capacity.

It has been found that suitable impregnating solutions, capable of simultaneously activating and crosslinking cellulosic materials and which fulfill the above stipulated requirements, are prepared by adding to activating solutions of the type specified in U.S. Patent No. 2,805,196, a phenol together with formaldehyde, said phenol being characterized by having at least two nuclear hydrogen atoms at which addition of formaldehyde occurs.

In general, the present invention is a process of preparing permselective membranes, cationic or anionic, from cellulosic base materials in sheet form, characterized by thermal treatment of the cellulosic material impregnated with acid aqueous solution which contains, firstly, a compound possessing both ionic and N-methylolamide groups, secondly, a phenol characterized by having at least two nuclear hydrogen atoms at which addition of formaldehyde occurs, and, thirdly, formaldehyde.

Furthermore, according to this invention, the crosslinking of the cellulosic base materials which is effected simultaneously with the introduction of ionic groups, can be effected to a controllable degree which permits close control over the permeability to electrolytes of the resultant membranes.

In a preferred process for carrying out the methods of this invention as applied to the preparation of permselective membranes, intended for use in the electrodialytic desalting of brackish water, the degree of crosslinking is controlled to such an extent that the rate of permeability to electrolytes of the membranes falls within the range 0.05 and 0.70 millimicron equivalents of electrolyte per square centimetre of membrane surface per second, these values relating to a system in which the membrane is interposed between neutral aqueous 5,000 p.p.m. NaCl solution and distilled water, both liquids being efficiently stirred and maintained at a temperature of 30° C.

More particularly, according to this invention, the composition, concentration and pH of the aqueous solution to be used for treating the cellulosic base material depends upon the type of membrane required to be prepared, that is, either anionic or cationic, and upon the nature of the membrane desired, that is, either highly impermeable to electrolytes or only moderately so. The basic procedure consists of immersing the cellulosic base material in the chosen solution, generally at room temperature and for a period of several hours, and then curing the impregnated material at any temperature above 120° C. and below that at which the membrane would be damaged or destroyed, for a time preferably between 3 and 30 minutes, the longer times being used at the lower temperatures. The best results are generally obtained at a temperature close to 150° C., but the precise conditions to be chosen depend on the result required, the composition and pH of the impregnating solution and also upon the manner in which the treated cellulosic base material is heated, whether by freely suspending it in an oven containing a hot gas, for example, air, or by bringing it into intimate contact with a hot roll, or by heating it in any other system, for example by infrared or radio-frequency radiation, which may give a rate of heat transfer different from that which is obtained by contact with a hot gas. The manner of heating should, in any case, be such that the treated cellulosic material attains during heating a substantially dry state, said dry state implying a water content of not more than 5% by weight.

Also, according to this invention, impregnating solutions which enable the simultaneous activation and crosslinking of cellulosic base materials to be carried out are obtained by adding to an aqueous solution of a salt containing an N-methylolamide group, at a molar concentration preferably not less than 1.5, a phenol or a mixture of phenols together with formaldehyde. In preferred processes according to this invention, the quantity of phenolic substance introduced is of the order of 5 to 10 percent by weight of the activating solution to which it is added, while the quantity of aldehyde added may be in a proportion of a similar order of magnitude. Such proportions do not have so great an effect on the concentration of the salt containing the N-methylolamide group as substantially to reduce the ability of the solution to impart ion exchange properties.

Whereas in the above disclosure the preparation of solutions for achieving simultaneous activation and crosslinking according to this invention was described as a process of adding certain reagents to an aqueous solution of the salt containing an N-methylolamide group or groups, this description was given solely for the sake of convenience and clarity. It is possible, according to this invention, to prepare the impregnating solutions by any convenient sequence of addition of the constituents.

The following examples are given by way merely of illustration of the method of carrying out this invention:

*Example I*

An impregnating solution was prepared of the following composition: hydroxymethylcarbamylmethyltrimethylammonium chloride (44 g.), phenol (8 g.), 37% formalin (20 ml.), water to make 100 ml. of solution; the pH of the latter was then adjusted to 2.5 by the addition of hydrochloric acid.

A 9 cm. diameter circle of Vohlit brown kraft parchment paper having a weight of 75 to 85 g./sq. m. (said parchment paper having been prepared from an unbleached sulphate pulp and parchmentised by the sulphuric acid process, and which was unsized, unsalted and with a calendered finish), was immersed overnight at room temperature in the impregnating solution componded as described above. After immersion, excess impregnating solution was expressed from the sheet by passing it between rolls under light pressure. The impregnated sheet was suspended from a metal frame and then cured in an air oven at 140° C. for a period of 30 minutes. After curing, the membrane was removed from the oven, allowed to cool in air, and finally thoroughly washed in running water.

Characterization tests on the membrane obtained gave the following results: conductance, 165 millimho per square centimetre membrane surface in 1,000 p.p.m. neutral aqueous NaCl solution at 30° C. and measured at a frequency of 2,000 c.p.s.; rate of free diffusion of NaCl through the membrane, $0.28 \times 10^{-6}$ milli-equiv. per square centrimetre per second when the membrane is placed between 5,000 p.p.m. neutral aqueous NaCl solution and distilled water at 30° C.; the transport number of the sodium ion in the membrane measured by the Hittorf method at a concentration of 0.3 N NaCl, 0.023.

*Example II*

An impregnating solution was prepared of the following composition: hydroxymethylcarbamylmethylisoquinolinium chloride (60 g.), phenol (8 g.), 37% formalin (20 ml.), and water to make 100 ml. of solution. The pH of the solution was then adjusted to 2.5 by the use of hydrochloric acid.

Except that this solution was used in the place of that described in Example I, a 9 cm. diameter circle of parchment paper identical to that used in Example I was treated in exactly the same manner as regards impregnation, rolling, curing (in this instance at 150° C. for 30 minutes), and washing, as was described in that example. Characterization tests under the same conditions as are mentioned in Example I gave the following results: conductance, 39; rate of free diffusion of NaCl, $0.21 \times 10^{-6}$; sodium ion transport number, 0.048; the units employed being as in Example I.

*Example III*

Coal-tar bases extracted from once-run-benzole obtained from a high temperature carbonisation of blended South African coals in coke-ovens of the Becker type, were quaternised with methylolchloroacetamide to provide a suitable activator for the preparation of a permselective anion-exchange membrane from a cellulose base material in sheet form.

The extraction methods employed for the coal-tar bases and details of results obtained are to be found in Houghen, F. W. and Raal, M. A.: "The Composition of the Bases From an ISCOR Coal-Tar"; Journal of the South African Chemical Institute, September 1954.

The chloride salt of the quaternised coal-tar bases (ex ISCOR) which had a melting range of 160 to 163° C. was used to prepare an impregnating solution according to the following composition: chloride salt of quaternised mixed coal-tar bases (ex ISCOR), (51 g.), phenol (9 g.) 37% formalin (12 ml.), and water to make 100 ml. of solution; the pH of the latter was then adjusted to 2.5 with hydrochloric acid before use.

Vohlit brown kraft parchment paper of the same substance, type, quality and origin as that employed in Example I, again formed the cellulose base material used in this case. A 9 cm. diameter circle of this parchment paper was processed as described in the previous examples, i.e. impregnation in the solution compounded as detailed above, rolling to express excess solution, heat-curing the so impregnated sheet at 150° C. for 30 minutes, and thorough washing of the resultant membrane.

Characterisation tests conducted, reported and expressed as in the previous examples gave the following results: conductance, 73; rate of free diffusion of NaCl, $0.66 \times 10^{-6}$; transport number of the sodium ion in the membrane, 0.073.

Example IV

The activator as employed in Example III was again used to compound an impregnating solution. In this case, however, the phenolic substance used consisted of a mixed coal-tar acids (ex ISCOR) of the following composition: phenol, 69%; o-cresol, 9%, m-cresol, 11%; p-cresol, 11%. The impregnating solution was compounded as follows: Chloride salt of quaternised mixed coal-tar bases (ex ISCOR) (51 g.), mixed coal-tar acids (ex ISCOR) (17 ml.), 37% formalin (35 ml.), and water to make 100 ml. of solution. The pH of the solution was adjusted to 2.4 with hydrochloric acid.

The cellulosic sheet material used in this example was the same as that described in Example I. This material and the solution compounded as described above were used to prepare an anion-permeable membrane by the same procedure as was described in Example I, the curing being carried out at 150° C. for thirty minutes. The results of characterization tests conducted, reported and expressed as in the previous examples, were: conductance, 58; rate of free diffusion of NaCl, $0.17 \times 10^{-6}$; transport number of the sodium ion, 0.062.

Example V

A solution was prepared of acetamidomethylol sodium sulphonate (42 g.), phenol (8 g.), 37% formalin (20 ml.) with water to make 100 ml. Its pH was adjusted to 2.5 using hydrochloric acid. The same cellulosic sheet material as was described in Example I was treated with this solution in the manner given in Example I, the curing conditions being 30 minutes at 150° C. The results of characterisation were: conductance, 43; rate of free diffusion of NaCl, $0.66 \times 10^{-6}$; and sodium ion transport number, 0.907; the methods of determination and expression being as in Example I.

Example VI

To each of five 58 ml. portions of a 500 g./l. solution of hydroxymethylcarbamylmethylpyridinium chloride were added 10 ml. of 37% formalin. In order to study the influence of using several different phenols, equimolar quantities of five different phenols were added to the different solutions as follows:

|   | G. |
|---|---|
| (1) Phenol | 4.6 |
| (2) o-Cresol | 5.3 |
| (3) m-Cresol | 5.3 |
| (4) p-Cresol | 5.3 |
| (5) Resorcinol | 5.4 |

The pH of each solution was then adjusted to 2.2 by the addition of hydrochloric acid.

The same cellulosic sheet material and method of processing as was described in Example I was used to prepare anion-permeable membranes from these solutions. The curing conditions employed were 20 minutes at 150° C. The results of characterization tests, conducted and reported as in Example I, were:

| Phenol used | Conductance | Free diffusion $\times 10^6$ |
|---|---|---|
| Phenol | 80 | 0.39 |
| o-Cresol | 110 | 0.47 |
| m-Cresol | 84 | 0.49 |
| p-Cresol | 90 | 0.43 |
| Resorcinol | 70 | 0.43 |

Example VII

An impregnating solution was prepared from methylolcarbamidomethylpyridinium chloride (5000 g.), phenol (800 g.), 37% formalin (1600 ml.) and water (5000 ml.). The pH of the solution was adjusted to 2.4 by the addition of hydrochloric acid.

A piece of white parchmentised paper measuring 30 x 95 cm. and of about 140 g. per square metre weight (said parchment paper having been prepared from a bleached sulphate pulp and parchmentised by the sulphuric acid process and which was unsized, unsalted and with calendered finish), was immersed overnight at room temperature in the solution compounded as described above. The impregnated sheet was then removed from the impregnating solution and surface excess of the latter solution removed by expressing between rolls under light pressure. The impregnated material was placed on a sheet of glass fibre cloth supported by a metal plate and then covered with a sheet of canvas held in position by spring-loading so as to prevent distortion of the impregnated material during the curing process. The assembly consisting of metal plate, glass fibre cloth, impregnated sheet and canvas cover was then inserted into an oven at 145° C. Curing was allowed to proceed for 30 minutes after which the sheet was removed from the oven, allowed to cool and then immersed in a large volume of water. Characterisation tests were carried out on the membrane after it had been allowed to soak for at least three days to ensure that all exchange active material not linked to the cellulose was eliminated.

The membrane prepared as described above had a conductance of 100 millimhos per square centimetre of membrane surface in 1000 p.p.m. neutral aqueous NaCl solution at 30° C. and measured at a frequency of 2,000 c.p.s., although it permitted free diffusion of NaCl at a rate of only $0.33 \times 10^{-6}$ m. equiv. per square cm. per sec. when placed between 5,000 p.p.m. neutral aqueous NaCl solution and distilled water at 30° C. The transport number of the sodium ion in the membrane measured electrometrically in the system: Ag/AgCl/NaCl (0.2 N)/membrane/NaCl (0.4 N)/AgCl/Ag at 30° C. was found to be 0.050.

Example VIII

An apparatus for the electrodialytic demineralisation of brack water was constructed in accordance with U.S. Patent No. 2,758,085 and U.S. patent application Ser. No. 600,328, filed July 26, 1956. It consisted of four packets each of 50 cationic and 50 anionic membranes, the intermembrane spacing of 0.065" being filled with perforated corrugated sheet material composed of polyvinyl chloride. The anode and cathode were of magnetite and stainless steel respectively and the electrode rinse liquids were in both cases brack water of 3,900 p.p.m. NaCl concentration which was flowed at 200 litres per hour. The four packets were separated from one another by "intermediate plates" as described in the aforesaid U.S. patent application Ser. No. 600,328. Membranes having original untrimmed dimensions of 30 x 95 cm. were employed, but the active surface utilised was 800 square cm. The apparatus was installed with anionic membranes prepared as described in Example VII and cationic membranes having the following average characteristics: conductance, 51 millimhos per square centimetre membrane surface, in 1,000 p.p.m. neutral aqueous NaCl solution at 30° C., measured at 2,000 c.p.s.; the rate of free diffusion of NaCl through the membrane, $0.42 \times 10^{-6}$ m. equiv. per square cm. per sec., when placed between 5,000 p.p.m. NaCl solution and distilled water at 30° C.; transport number of the sodium ion in the membrane, measured electrometrically in the system: Ag/AgCl/NaCl (0.2 N)/membrane/NaCl (0.4 N)/AgCl/Ag at 30° C., 0.90.

The apparatus was operated on feed water from an underground source (as dialysate) which had been pretreated to give the following composition:

| | |
|---|---|
| $Cl^-$ | 3938 p.p.m. as NaCl. |
| $Ca^{++}$ | 305 p.p.m. as $CaCO_3$. |
| $Mg^{++}$ | 35 p.p.m. as $CaCO_3$. |
| $SO_4^{--}$ | 150 p.p.m. as $SO_4^{--}$. |
| pH | 6.0. |

Feed water of the above composition was introduced into the dialysate compartments of the electro-dialysis apparatus at a rate of 5,040 litres per hour while in the brine compartments of the apparatus a continuously cycled flow of brine at the rate of 2,620 litres per hour was maintained. The performance of the apparatus, operated at 24° C. with 9.6 A. total current (12 ma./square cm. active surface), was as follows:

Average brine concentration about 7,000 p.p.m. NaCl; voltage over entire apparatus, 196; desalting of dialysate in one pass, 672 p.p.m.; coulomb efficiency 84.8%.

We claim:

1. A process of preparing permselective membranes from parchmentised paper, comprising the steps of (I) impregnating the parchmentised paper with an aqueous solution having a pH value within the range of 1.5 to 4.0, and containing, per liter of said solution, (a) not less than 0.5 mole of a salt which possesses both ionic and N-methylolamide groups, (b) between 0.2 and 2.5 moles of a phenol having at least two hydrogen atoms susceptible to methylol formations and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

2. Permselective membranes prepared from parchmentised paper by a process which comprises the steps of (I) impregnating the parchmentised paper with an aqueous solution having a pH value within the range 1.5 to 4.0, and containing, per liter of said solution, (a) not less than 0.5 mole of a salt which possesses both ionic and N-methylolamide groups, (b) between 0.2 and 2.5 mole of a phenol having at least two hydrogen atoms susceptible to methylol formation, and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

3. A process of preparing permselective membranes from parchmentised paper, comprising the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of a phenol having at least two hydrogen atoms susceptible to methylol formation and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

4. Permselective membranes prepared from parchmentised paper by a process which comprises the steps of impregnating the parchmentised paper with an aqueous solution having a pH value within the range 1.5 to 4.0, and containing per liter of said solution, (a) not less than 0.5 mole of a member selected from the group consisting of a hydroxymethylcarbamylmethyl quaternary ammonium salt and a mixture of such salts, (b) between 0.2 and 2.5 mole of a phenol having at least two hydrogen atoms susceptible to methylol formation and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

5. A process of preparing permselective membranes from parchmentised paper, comprising the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of phenol and (c) formaldehyde in the molar ratio of 1.0 and 5.0 mole of aldehyde per mol of phenol and (II) heating the so-impregnated parchmentised paper at a temperature of at least 120° C. whereby water escapes and the product is obtained in a dry state.

6. Permselective membranes prepared from parchmentised paper by a process which comprises the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of phenol and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

7. A process of preparing permselective membranes from parchmentised paper, comprising the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of at least one cresol and (c) formaldehyde in the molar ratio of 1.0 to 5.0 mole of aldehyde per mole of cresol, and (II) heating the so-impregnated parchmentised paper at a temperature of at least 120° C. whereby water escapes and the product is obtained in a dry state.

8. Permselective membranes prepared from parchmentised paper by a process which comprises the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of at least one cresol and (c) formaldehyde in the molar ratio of 1.0 to 5.0 mole of aldehyde per mole of cresol, and (II) heating the so-impregnated parchmentised paper at a temperature of at least 120° C. whereby water escapes and the product is obtained in a dry state.

9. A process of preparing permselective membranes from parchmentised paper, comprising the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of resorcinol and (c) formaldehyde in the molar ratio of 1.0 to 5.0 mole of aldehyde per mole of resorcinol, and (II) heating the so-impregnated parchmentised paper at a temperature of at least 120° C. whereby water escapes and the product is obtained in a dry state.

10. Permselective membranes prepared from parchmentised paper by a process which comprises the steps of (I) impregnating the parchmentised paper with an aqueous solution having a pH value within the range 1.5 to 4.0, and containing, per liter of said solution, (a) not less than 0.5 mole of at least one hydroxymethylcarbamylmethyl quaternary ammonium salt, (b) between 0.2 and 2.5 mole of resorcinol and (c) formaldehyde in the molar ratio of 1.0 to 5.0 mole of aldehyde per mole of resorcinol, and (II) heating the so-impregnated parchmentised paper at a temperature of at least 120° C. whereby water escapes and the product is obtained in a dry state.

11. A process of preparing permselective membranes from parchmentised paper, comprising the steps of (I) impregnating the parchmentised paper with an aqueous solution having a pH value within the range 1.5 to 4.0, and containing, per liter of said solution, (a) not less than 0.5 mole of one or more alkali metal salts of hydroxymethylcarbamylmethyl sulphonic acid, (b) between 0.2 and 2.5 mole of at least one phenol, the latter having at least two hydrogen atoms susceptible to methylol formation and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

12. Permselective membranes prepared from parchmentised paper by a process which comprises the steps of (I) impregnating the parchmentised paper with an aqueous solution having a pH value within the range 1.5 to 4.0, and containing, per liter of said solution, (a) not less than 0.5 mole of one or more alkali metal salts of hydroxymethylcarbamylmethyl sulphonic acid, (b) between 0.2 and 2.5 mole of at least one phenol, the latter having at least two hydrogen atoms susceptible to methylol formation and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

13. A process of preparing permselective membranes from parchmentised paper, comprising the steps of (I) impregnating the parchmentised paper with an aqueous solution having a pH value within the range 1.5 to 4.0, and containing, per liter of said solution, (a) not less than 0.5 mole of an alkali metal salt of hydroxymethylcarbamylmethyl sulphonic acid, (b) between 0.2 and 2.5 mole of phenol and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

14. Permselective membranes prepared from parchmentised paper by a process which comprises the steps of (I) impregnating the parchmentised paper with an aqueous solution having a pH value within the range 1.5 to 4.0, and containing, per liter of said solution, (a) not less than 0.5 mole of an alkali metal salt of hydroxymethylcarbamylmethyl sulphonic acid, (b) between 0.2 and 2.5 mole of phenol and (c) formaldehyde in the molar ratio of 1.0 to 5.0 mole of aldehyde per mole of phenol, and (II) heating the so-impregnated parchmentised paper at a temperature of at least 120° C. whereby water escapes and the product is obtained in a dry state.

References Cited in the file of this patent

UNITED STATES PATENTS

| | | |
|---|---|---|
| 2,593,540 | Cornwell | Apr. 22, 1952 |
| 2,773,114 | McAuslan | Dec. 4, 1956 |
| 2,805,196 | Roebersen et al. | Sept. 3, 1957 |